(12) United States Patent
Mitten et al.

(10) Patent No.: US 6,910,614 B2
(45) Date of Patent: Jun. 28, 2005

(54) VACUUM COMPRESSION BRAZING FURNACE AND METHOD OF USING SAME

(75) Inventors: Wayne Mitten, Mesa, AZ (US); Leonard Ohrin, Roslyn, PA (US); William McVeigh, Philadelphia, PA (US)

(73) Assignee: IPSEN International, Inc., Cherry Valley, IL (US)

( * ) Notice: Subject to any disclaimer, the term of this patent is extended or adjusted under 35 U.S.C. 154(b) by 0 days.

(21) Appl. No.: 10/359,545

(22) Filed: Feb. 5, 2003

(65) Prior Publication Data

US 2003/0160088 A1 Aug. 28, 2003

Related U.S. Application Data

(60) Provisional application No. 60/354,793, filed on Feb. 5, 2002.

(51) Int. Cl.[7] .............................................. B23K 37/00
(52) U.S. Cl. ....................... 228/46; 228/49.1; 228/49.2; 219/159; 219/385; 432/123
(58) Field of Search ..................... 228/46, 49.1, 49.2; 219/79, 85.17, 159, 385, 391, 393, 647, 774; 432/123, 160

(56) References Cited

U.S. PATENT DOCUMENTS

| | | | |
|---|---|---|---|
| 2,734,738 A | | 2/1956 | Even |
| 3,769,675 A | * | 11/1973 | Chartet ........................ 228/183 |
| 3,853,637 A | * | 12/1974 | Gray et al. ................. 148/712 |
| 3,866,891 A | * | 2/1975 | Kalbfleisch ................. 266/250 |
| 3,889,083 A | * | 6/1975 | Guaglione et al. ............ 218/69 |
| 4,102,637 A | * | 7/1978 | Kreider et al. ............... 432/227 |
| 4,285,504 A | | 8/1981 | Colvin |
| 4,462,577 A | * | 7/1984 | Westeren .................... 266/250 |
| 4,559,631 A | | 12/1985 | Moller |
| 4,610,435 A | | 9/1986 | Pfau et al. |
| 4,808,788 A | * | 2/1989 | Bares ....................... 219/85.17 |
| 4,886,449 A | * | 12/1989 | Brittin ........................ 432/121 |
| 4,906,182 A | | 3/1990 | Moller |
| 5,502,742 A | * | 3/1996 | Kellogg et al. ............. 373/128 |
| 5,709,544 A | | 1/1998 | Wurtz |
| 6,036,793 A | * | 3/2000 | Melgaard et al. ........... 148/708 |
| 6,349,108 B1 | * | 2/2002 | Ashburn ..................... 373/110 |
| 6,533,991 B1 | | 3/2003 | Moller |
| 6,715,662 B2 | * | 4/2004 | Rogers et al. .............. 228/102 |
| 6,756,566 B2 | | 6/2004 | Moller |
| 2003/0160088 A1 | * | 8/2003 | Mitten et al. ............... 228/219 |
| 2004/0007565 A1 | | 1/2004 | Moller |

FOREIGN PATENT DOCUMENTS

| | | |
|---|---|---|
| DE | 3616871 | 11/1986 |
| EP | 0272163 | 6/1988 |
| JP | 2002005575 | 1/2002 |
| WO | WO 03/066265 A2 * | 8/2003 |

OTHER PUBLICATIONS

International Search Report (PCT/US03/03478), Jan. 2004.
Technical data, Seco/Warwick, Jun. 2001.
Technical data, Abar Ipsen (no date).
Technical data, VFS, Sep. 1998.
Abar Ispen Equipment Specifications, Nov. 1998.

* cited by examiner

Primary Examiner—Kiley S. Stoner
(74) Attorney, Agent, or Firm—Dann, Dorfman, Herrell and Skillman, P.C.

(57) ABSTRACT

A vacuum heat treating furnace for brazing a large metallic part is disclosed. The vacuum furnace includes a pressure vessel having a cylindrical wall and a door dimensioned and positioned for closing an end of the cylindrical wall. A workpiece handling system is mounted on the pressure vessel door for supporting a metallic workpiece to be heat treated or brazed. The workpiece handling system includes apparatus for rotating the workpiece during a processing cycle. A vacuum system is connectable to the workpiece for creating a subatmospheric pressure inside the workpiece during a brazing cycle.

13 Claims, 12 Drawing Sheets

VACUUM COMPRESSION BRAZING FURNACE AND METHOD OF USING SAME

This application claims priority under 35 U.S.C. §119(e) from U.S. Provisional Application No. 60/354,793, filed Feb. 5, 2002, which is incorporated herein by reference.

FIELD OF THE INVENTION

This invention relates to vacuum furnaces for industrial heat treating, and in particular to a vacuum furnace for brazing a large workpiece or a large batch of smaller workpieces.

BACKGROUND OF THE INVENTION

Vacuum furnaces are known and used for brazing metal parts to form an integral body or component. The known vacuum brazing furnaces are most effective with parts having relatively small cross sections. The vacuum brazing of very large metallic bodies has been complicated by two factors: non-uniform heating of the parts being brazed and a limited ability to maintain the parts in intimate contact during the brazing process. Either factor results in ineffective brazing. Accordingly, there is a need for a vacuum furnace for use in the brazing of very large metallic bodies that overcomes those problems.

A vacuum furnace that is designed for brazing very large parts is a highly complex system which is very expensive to build and maintain. The high cost of such a furnace adversely affects the return on the investment in the system if its utility is limited to a single purpose. Accordingly, a need has arisen for a vacuum furnace that can be used not only for brazing of large metal parts, but also for other types of heat treating cycles. Therefore, it would be desirable to have a vacuum heat treating furnace which can accommodate different types of workpiece loads and which can be operated to perform different types of heat treatments on such loads.

SUMMARY OF THE INVENTION

The deficiencies of the known vacuum brazing furnaces are overcome to a large degree by the vacuum brazing furnace and method of using same in accordance with the present invention.

In accordance with a first aspect of the present invention, there is provided a vacuum furnace for brazing or heat treating a large metallic part. The vacuum furnace according to this invention includes a pressure vessel having a cylindrical wall and a door dimensioned and positioned for closing an end of the cylindrical wall and a thermally insulated enclosure disposed in said pressure vessel which defines a hot zone therein. A plurality of electric heating elements are mounted to said thermally insulated enclosure in the hot zone. A first vacuum system is connected to the pressure vessel for drawing a vacuum in the interior of the pressure vessel, including said hot zone. The vacuum furnace of this invention also includes a workpiece handling system mounted on the pressure vessel door for supporting a metallic workpiece having a first part and a second part, which when assembled together have a spaced region therebetween.

The workpiece handling system includes a transport mechanism for moving the door relative to the pressure vessel, so that the pressure vessel can be opened and closed. The workpiece handling system also has a mechanism for rotating the workpiece inside the vacuum heat treating furnace so that the workpiece is heated evenly during a brazing cycle. Further, the workpiece handling system includes a second vacuum system that is connectable to the workpiece such that a subatmospheric pressure can be applied to the spaced region in the workpiece, whereby parts being brazed are maintained in intimate contact during the brazing cycle.

In accordance with another aspect of this invention, there is provided a method for vacuum brazing a metallic workpiece. The method of this invention includes the step of providing a workpiece having a first part and a second part, which when assembled together have a spaced region therebetween. The workpiece is mounted on a rotatable support disposed in a door of a vacuum heat treating furnace. After the workpiece is mounted on the rotatable support, the support is moved into the vacuum heat treating furnace and the door is closed and sealed. A vacuum is drawn in the vacuum heat treating furnace and the workpiece is heated to an elevated temperature suitable for brazing the workpiece. During the brazing cycle, the workpiece is rotated with the rotatable support so that it is heated evenly. Preferably, the method of this invention includes the step of drawing a vacuum in the spaced region of the workpiece during the heating step, whereby the parts being brazed are maintained in intimate contact during the brazing cycle.

BRIEF DESCRIPTION OF THE DRAWINGS

The foregoing summary as well as the following detailed description of a preferred embodiment of the present invention will be better understood when read with the appended drawings, wherein.

DETAILED DESCRIPTION

Figure 1:
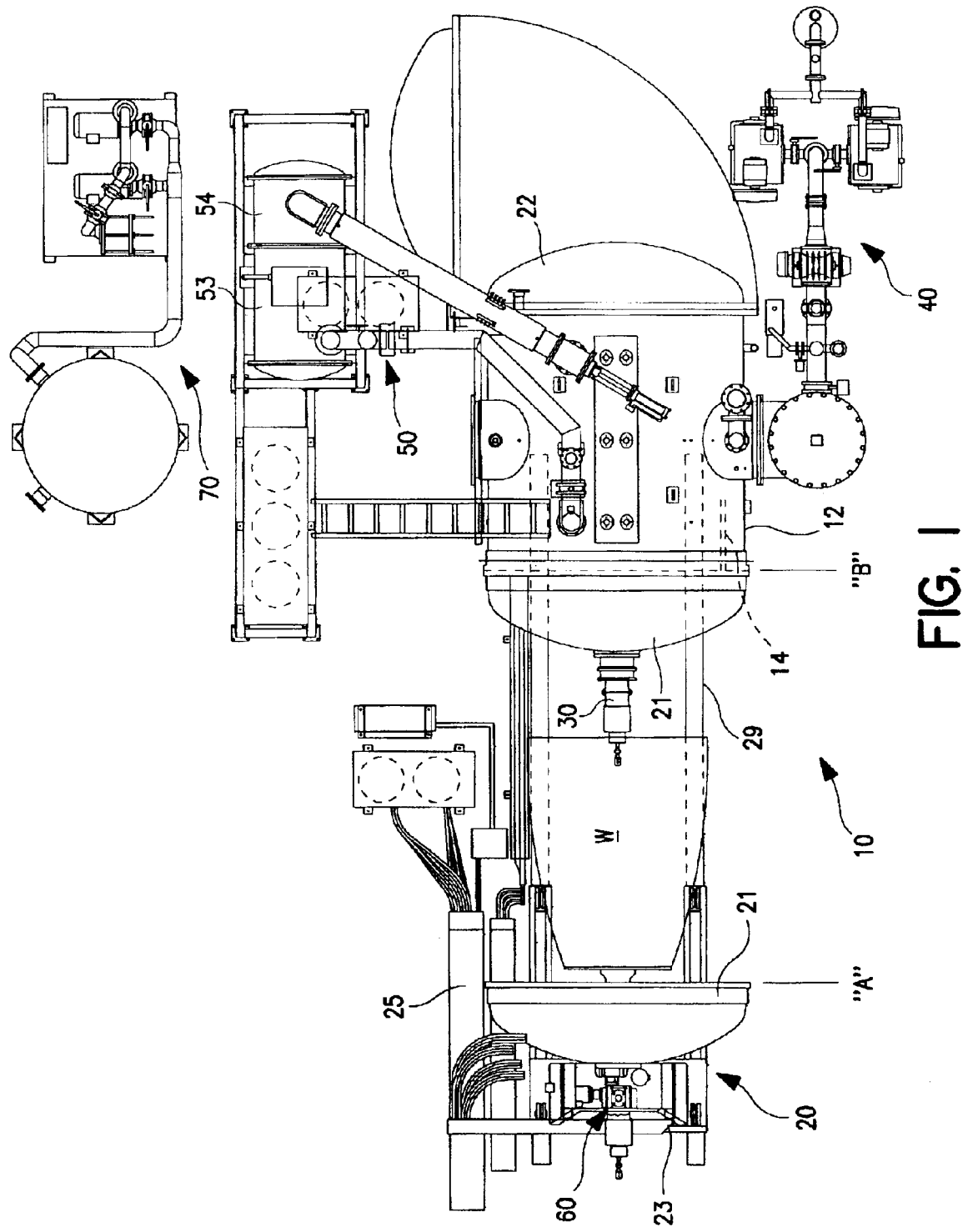
FIG. 1 is a top plan view of a vacuum heat treating furnace in accordance with the present invention.

A preferred embodiment of a vacuum brazing furnace according to the present invention has a pressure vessel that is constructed in a horizontal configuration. The pressure vessel is a water cooled, double-wall steel assembly. First and second vacuum pumping systems are provided for the vacuum brazing furnace. The first vacuum pumping system is connected to the furnace chamber and the second vacuum pumping system is adapted to be connected to an internal cavity of the workpiece. The vacuum pumping systems are independent and are of sufficient capacity such that multiple backfills and pump-out/purge cycles are not required.

The workpiece is preferably carried on a rotatable mechanism that is adapted for supporting and rotating the workpiece inside the vacuum furnace during processing. The rotatable mechanism is mounted in the door that provides access to the furnace chamber. The door and the rotatable mechanism are supported on a transport mechanism that is self-powered. The transport mechanism also contains electrical and mechanical connections and equipment for the instrumentation and utilities required to operate the rotatable mechanism. The combination of the door, the rotatable mechanism, and the transport constitutes a workpiece handling system for the vacuum brazing furnace according to this invention. Alternatively, a stationary hearth support is provided in the furnace hot zone for workpieces that do not need to be rotated during processing.

The vacuum brazing furnace according to this invention also has a heating system. The heating system preferably includes a graphite shielded hot zone with electrically powered graphite heating elements. Alternatively, the hot zone shielding may be formed of a ceramic material such as alumina. Also, as an alternative to graphite, the heating elements may be formed of a refractory metal such as molybdenum, tungsten, or a nickel-chromium alloy. Heating of the workpiece in the hot zone is accomplished by direct radiation on the parts, by quiescent convection heating, and, when desired, by conduction heating through an inert gas atmosphere. Sufficient electrical power is provided to heat a workpiece weighing up to about 2500 pounds in not more than about thirty (30) minutes.

A process gas injection system is also provided for introducing an inert gas into the pressure vessel at a super-atmospheric pressure of up to 10 bar. Higher pressures can be used with proper design of the furnace pressure vessel. The furnace according to this invention also has a forced gas cooling system for the controlled cooling of the workpiece after brazing. The forced gas cooling system includes a blower, internal and external gas ducts, a plenum that surrounds the hot zone inside the furnace, and a heat exchanger for removing heat from the cooling gas.

The heating, vacuum, gas-injection, and forced gas cooling systems are controlled by a programmable logic controller (PLC). Operator interface is accomplished with a graphical display and either touch screen or keyboard input. A general purpose computer, such as a desktop personal computer (PC), is provided to observe the operation of the furnace systems. The PC is remote from each system control cabinet and may be either located in a general operating area for the furnace or remotely in an office environment. The PC may be used to generate process cycle recipes as well as to store, print and manipulate data from the furnace during a process cycle.

Figure 5:
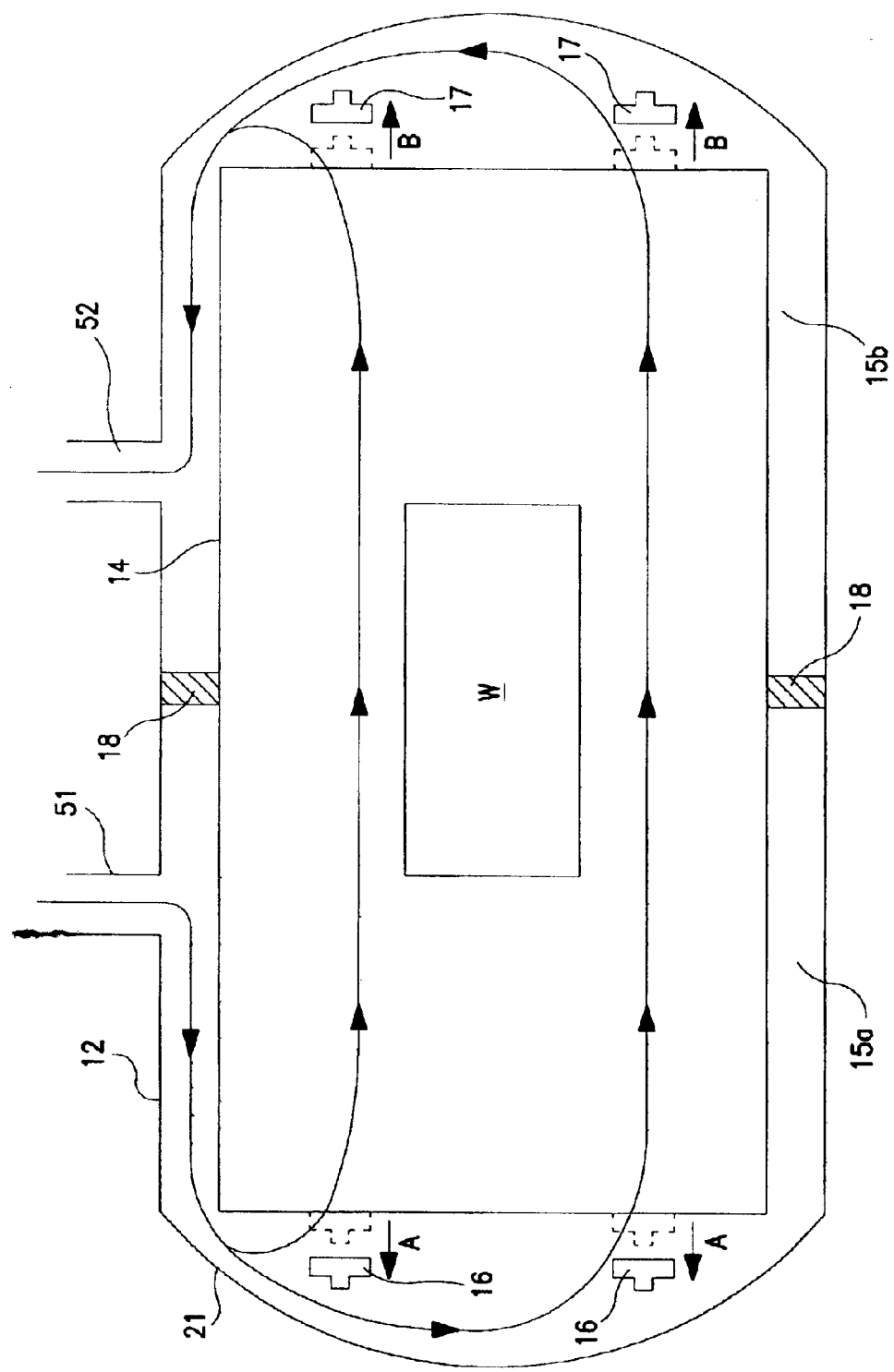
FIG. 5 is a schematic view of the hot zone and plenum used in the vacuum heat treating furnace of FIG. 1.

Referring now to the drawings, wherein like reference numerals refer to the same components across the several views, and in particular to FIGS. 1 and 5, there is shown a vacuum compression brazing furnace 10 in accordance with the present invention. Vacuum furnace 10 includes a pressure vessel 12 having a hot zone 14 disposed in the vessel chamber. Vacuum furnace 10 also includes a workpiece handling system 20 which is transportable relative to the pressure vessel 12 so that the handling system 20 may be moved between a first position "A" and a second position "B" relative to the pressure vessel 12. The workpiece handling system 20 includes the main access door 21 of the pressure vessel 12, a rotatable mechanism 30 for supporting and rotating a workpiece "W" during a brazing cycle, and a transport mechanism 23 for moving the workpiece handling system 20. A gas injection system is connected to the pressure vessel 12 so that the vessel chamber can be pressurized with an inert gas during a processing cycle.

The vacuum compression brazing furnace 10 further includes a first vacuum system 40 that is connected to the chamber of pressure vessel 12 for drawing a vacuum therein during a processing cycle. A second vacuum system 60 is provided in the work piece handling system 20 for evacuating an internal cavity of a workpiece "W" during the processing cycle. Additionally, a forced gas cooling system 50 is connected to the vessel chamber to assist with controlled cooling at the end of a brazing cycle.

The pressure vessel 12 is preferably of steel construction with machined door seal flanges and has a full main access door 21 at one end thereof for access to the vessel chamber. A second access door 22 may be provided at the other end of pressure vessel 12 for additional access to the vessel chamber. The pressure vessel 12 is constructed with a double steel wall to provide an annular cooling jacket in which cooling water is circulated during a heating cycle. The cooling water is recirculated between a cooling water storage tank and the annular cooling jacket in the pressure vessel 12 to remove heat from the surface of the pressure vessel 12. In this manner, the outer surface of the furnace is maintained at a safe temperature for operating personnel. The access doors are fabricated with cooling jackets and have inner and outer dished heads of steel and machined carbon steel sealing flanges. The main access door 21 has a locking mechanism that is of autoclave construction with a rotatable locking ring closure.

A furnace cooling system 70 is provided to cool the pressure vessel 12 and the vessel ancillary systems and components so that the structural integrity of the vessel is maintained and operating personnel are provided with a safe working environment. The furnace cooling system 70 utilizes a single coolant supply, preferably water, and a drain connection. The furnace cooling system 70 also includes the pressure regulating controls, sub-system controls, shut-off valves, manifolds, and hoses needed to provide the coolant to the pressure vessel 12 and the associated systems. The pressure vessel 12 is preferably equipped with one or more pressure relief valves which operate to bypass coolant to the drain when the coolant pressure exceeds a preset operating limit. A low temperature coolant cut-off subsystem is also provided which automatically shuts off the coolant flow to the pressure vessel during the cooling cycle when the coolant reaches a preselected temperature level, for example, about 300 F (150C). The shutting off of the coolant flow prevents the formation of condensation on the interior of the vessel chamber during unloading and loading of the workpiece. Coolant flow is permitted to resume at the beginning of the next furnace cycle. The furnace cooling system 70 is preferably a closed loop system to ensure the quality of the coolant. The furnace cooling system 70 preferably includes a cooling tower, a reservoir tank, a water-to-water heat exchanger, and the necessary pumps, valves, and system controls.

The furnace hot zone 14 has a generally cylindrical side wall and front and back end walls that are generally planar.

The front and back end walls are dimensioned to close the ends of the hot zone with substantially no gaps in the joints between the end walls and the side wall. In addition, to the tight closure of the cylindrical section and the end walls, all penetrations and joints are sealed with graphite wool or other suitable material. Further, longitudinal sheet metal blocking assemblies are provided around the cylindrical section and in the end walls. These features serve to minimize convection currents and temperature differentials in the hot zone and the workpiece resulting from heat loss to the cold wall of the furnace. The hot zone may be equipped with a stationary hearth support for supporting a workpiece during the brazing cycle.

The hot zone 14 includes heating elements and thermal insulation that are designed to provide uniform heating, efficient use of power, and fast uniform cooling. The hot zone is preferably constructed such that during a processing cycle, a temperature in the range of 500F to 3000F (260C to 1648C) can be achieved in the hot zone. The thermal insulation and heating elements are supported by the hot zone support structure which is preferably formed of multiple sections of stainless steel. The heating elements are preferably formed of graphite or a refractory metal and are installed not only in the cylindrical section of the hot zone 14, but also on the end walls thereof. The heating elements are typically flat, but may also be angled or curved depending on the size of the hot zone or to accommodate large workpieces. The heating elements are arranged circumferentially substantially completely around the interior of the hot zone for optimum, uniform heat transfer to the load. The heating elements are bolted in position with suitable hardware for ease of replacement in the event of damage. The heating elements may be divided into two or more trimmable zones for controlling the temperature uniformity during a heating cycle. By trimming the electric power applied to the heating elements, more or less heat can be generated in one section of the hot zone relative to another section. The heating element supports are designed for easy removal and installation. They are preferably designed such that a ¼ turn locks or unlocks them in place. A typical arrangement and construction of heating elements, in this case graphite heating elements, and their supports is shown and described in U.S. Pat. No. 4,559,631, the entire specification and drawings of which are incorporated herein by reference.

Figures 1A, 1B:
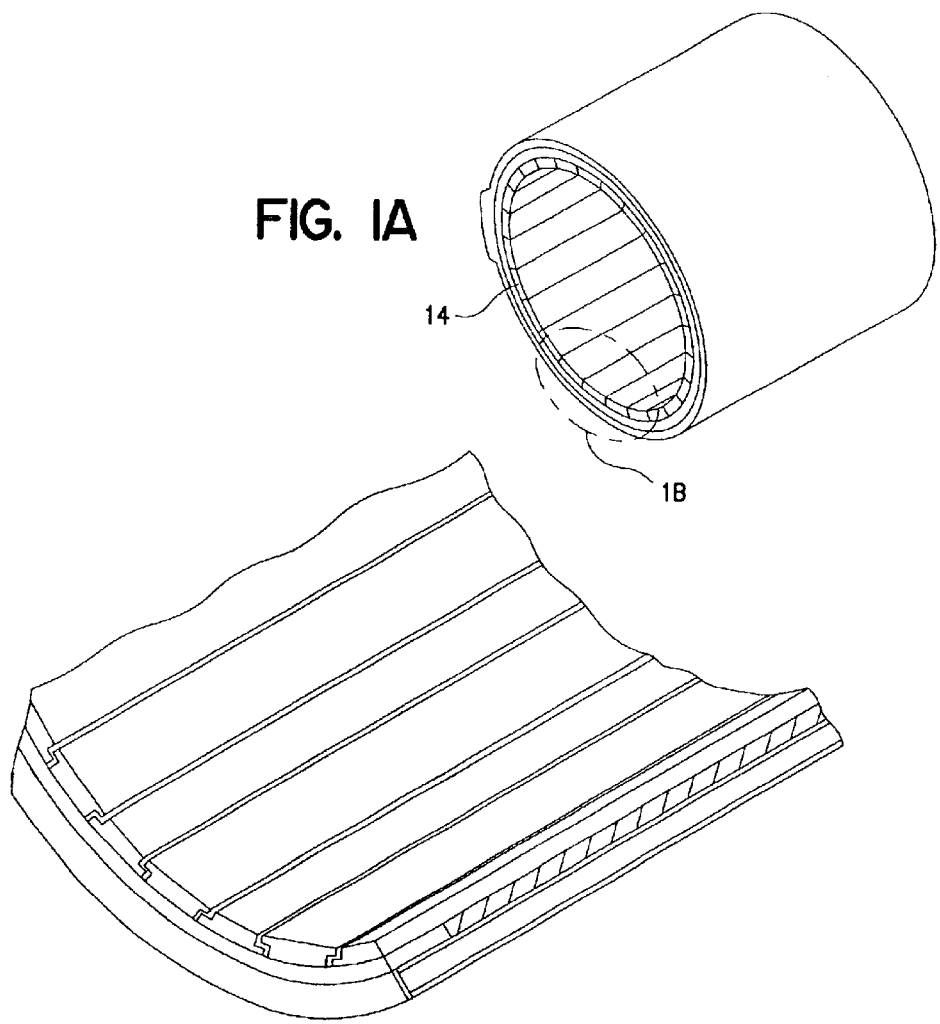
FIG. 1A is a perspective view showing construction features of a hot zone used in the furnace of FIG. 1.

The thermal insulation portion of the hot zone 14 is preferably formed from graphite boards with or without graphite foil bonded thereto. This inner thermal shield is backed with graphite felt insulation. Alternatively, rigid, semi-rigid or felt-type aluminum oxide insulation may be employed. The thermal insulation is supported by the cooling gas distribution plenum which is a steel construction. A preferred arrangement for the hot zone insulation is shown in FIG. 1A.

As described above, the heating elements can be connected to operate as multiple heating zones. The vacuum brazing furnace according to this invention has a temperature control system for controlling the operating temperature in the hot zone, either for uniform heating or for zoned heating. Each heating zone has a set of thermocouples. The furnace may be operated so that a different temperature is provided in each zone. This arrangement permits different portions of the workpiece to be heated to different temperatures when needed to optimize the brazing processing, especially for parts that are irregular in shape or have very different cross sections from one end to the other. The temperature control system receives temperature information from thermocouples that are placed at various locations on or in the workpiece. The temperature control system uses the temperature information to regulate the power applied to the heating elements in each zone, thereby controlling the temperature of the various portions of the workpiece.

The first vacuum system 40 includes a rough or low vacuum section and a high vacuum section. The roughing/low vacuum system includes one or more vacuum pumps that are connected to the pressure vessel 12 through an automatically controlled butterfly valve. The rough vacuum system preferably employs a single mechanical vacuum pump and blower assembly. For a larger furnace chamber the pumping system may include a second mechanical vacuum pump. The high vacuum system preferably includes one or more diffusion pumps that are directly connected to the chamber by right angle full port size poppet valves. A smaller mechanical vacuum pump is included to maintain the diffusion pump vacuum during operation of the low vacuum section.

The inert gas injection system includes a backfilling section and an operating pressure section. The gas backfill and operating pressure sections are both connected to an inert gas supply reservoir by appropriate piping and valves. The inert gas is preferably argon or nitrogen. The inert gas source supplies the gas at a pressure that is sufficiently high to achieve the desired operating pressure. For example, an approximately 275 psig source would be required to pressurize the furnace chamber to about 150 psig. The backfill and operating pressure sections are independent of each other, but they are supplied from the same source of inert gas. Two manual shut-off valves are connected in series downstream from the gas source to isolate the very high pressure gas supply reservoir from the operating systems. A solenoid operated vent valve is provided so that the chamber pressure may be "dumped" for process cycle aborts or safety concerns.

The gas backfill system has valves that are located adjacent to the pressure vessel 12. The backfill system valves preferably include a gate-type manual throttling valve to control the speed of the backfilling operation. A normally closed, on/off solenoid valve is provided downstream from the throttling valve. The solenoid valve operates between a fully opened position (on) and a fully closed position (off). Backfill speeds are manually adjustable by use of the gate type throttling valve. To avoid damage to the workpiece and the hot zone, a backfill time of preferably at least sixty seconds is recommended. For a large furnace the minimum backfill time can be from one to two minutes. The operation of the backfill solenoid valve is controlled by the PLC.

The operating pressure system consists of two separate subsystems: the supply control subsystem which controls increases in pressure during a processing cycle, and the vent control subsystem which controls any decrease in pressure during a processing cycle. The supply control subsystem includes a throttling valve to control maximum supply speed and an on/off solenoid valve to control chamber pressure. The throttling valve is manually operated and the operation of the solenoid valve is controlled by the PLC with input from the process cycle and the chamber pressure instruments. Gas pressure increases, including ramp-ups and holds, are programmed in the process cycle or recipe.

The chamber pressure is decreased and/or maintained (as pressure increases beyond the set point due to chamber and work temperature increases) by the vent control subsystem which is separate from the supply control subsystem. The chamber pressure is vented through an on/off solenoid valve and through a manually adjustable throttling valve to the atmosphere outside of the building in which the furnace is located. The on/off solenoid valve is controlled by the furnace's PLC with input from the process cycle program and the chamber pressure instruments.

Figure 2:
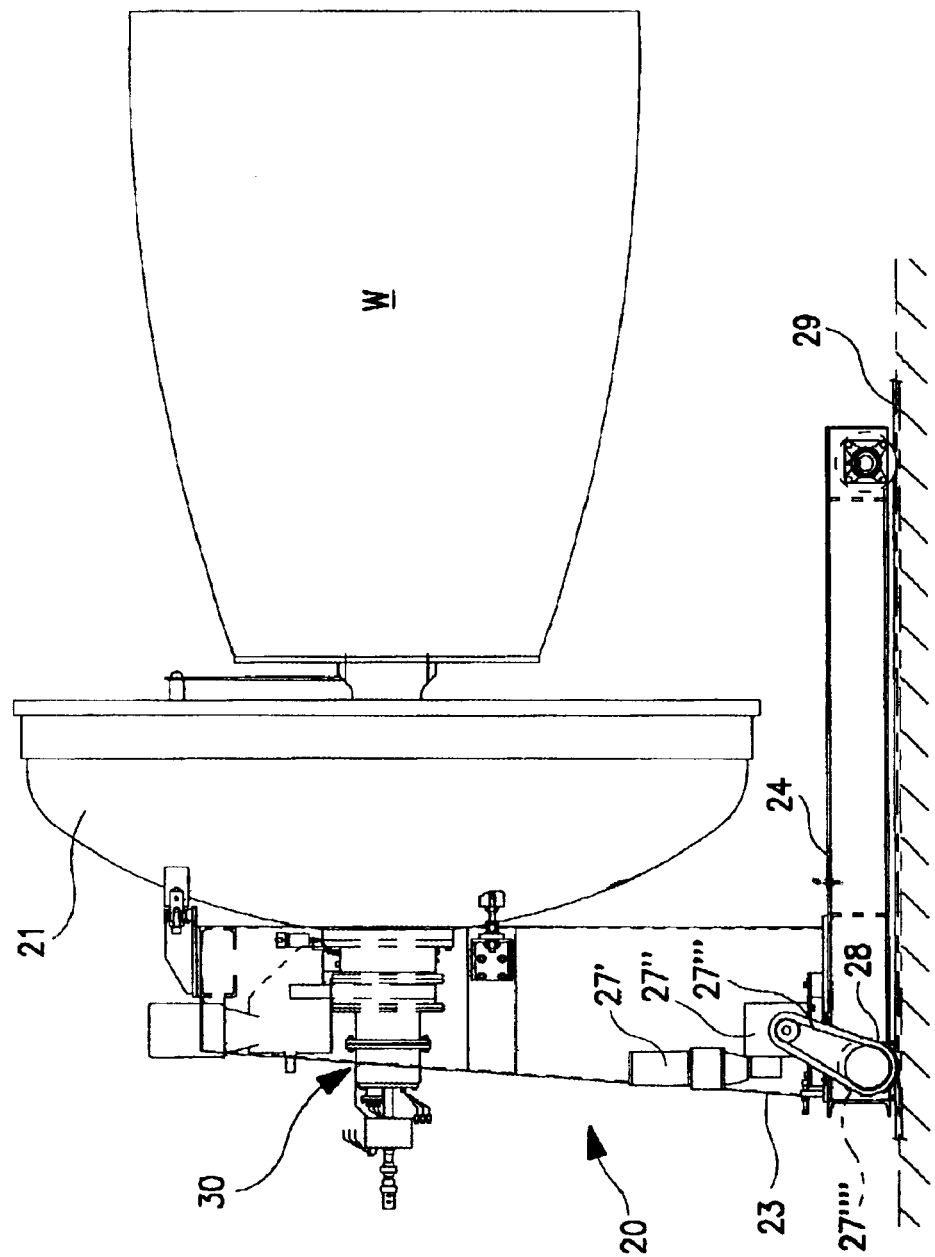
FIG. 2 is a side elevation view of a workpiece handling system for the vacuum heat treating furnace of FIG. 1.

The workpiece handling system 20 is a multifunction device that is provided for loading the workpiece into and unloading it from the furnace. It supports and rotates the workpiece during a brazing cycle. It is operable to open and close the pressure vessel door 21. As illustrated in FIG. 2, the workpiece handling system 20 includes the vessel door 21, a rotatable mechanism 30 for supporting and rotating the workpiece, and a transport mechanism 23 for moving the workpiece handling system 20. The rotatable mechanism 30 has a rotatable shaft assembly and a stationary shaft assembly.

Figure 3:
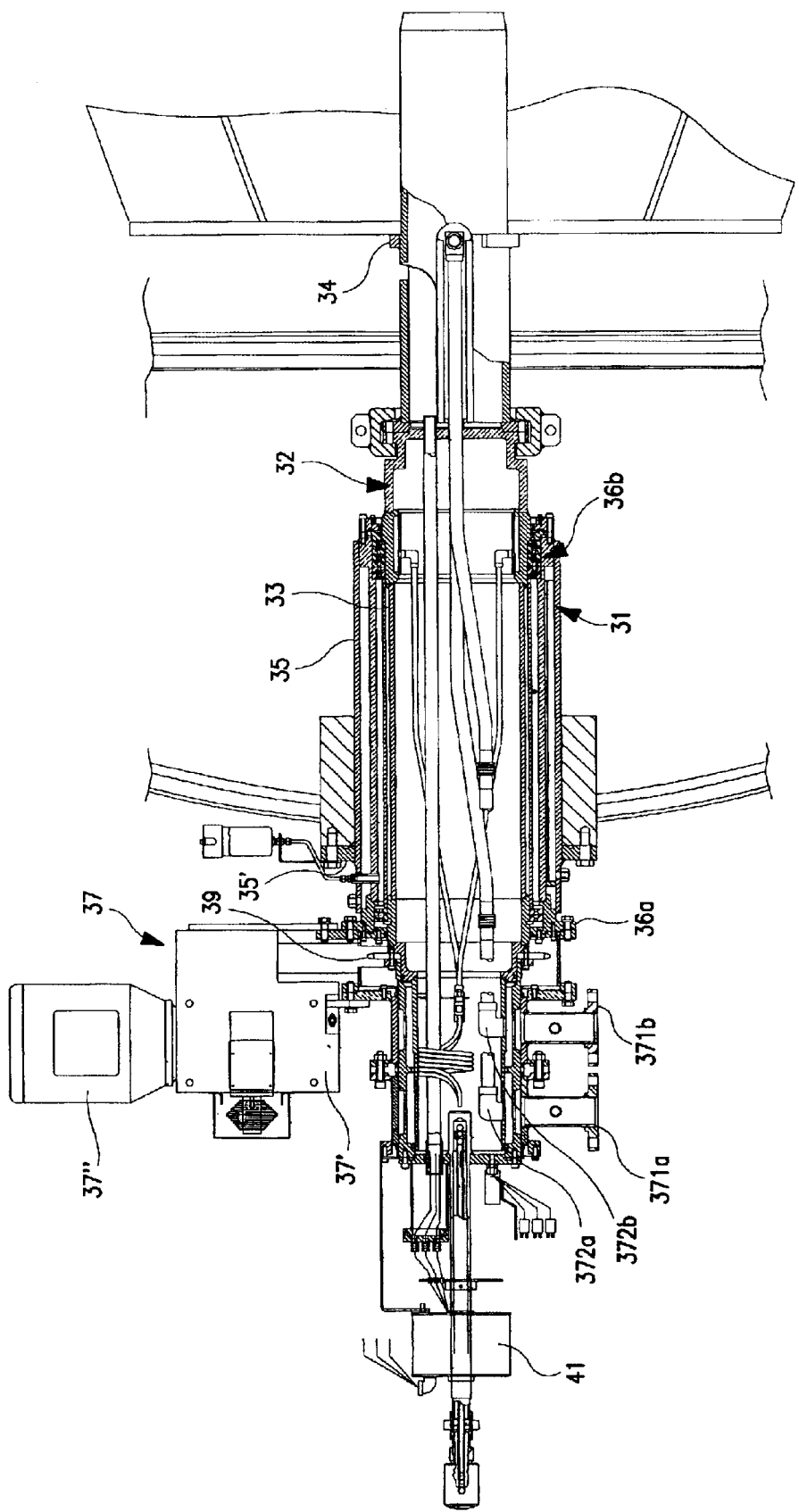
FIG. 3 is a side elevation view of a rotatable load-carrying mechanism for the vacuum heat treating furnace of FIG. 1.

Referring now to FIG. 3, the rotatable shaft assembly 32 includes a hollow tube that is preferably formed of stainless steel. The rotatable shaft assembly 32 has a flange 34 at one end thereof for bolting a workpiece fixture thereto. The workpiece is supported on the workpiece fixture. The rotatable shaft assembly 32 also includes vacuum, gas purge, and thermocouple lines for connections to the workpiece. The rotatable shaft assembly 32 is supported on two large bearings 36a, 36b. The rotatable shaft assembly 32 also has an internal tubing that is connected to a source of coolant, preferably water, for cooling the rotatable shaft during a heating cycle. The coolant flows into the end of the rotatable shaft assembly 32 and through the tubing which extends along the length thereof. The coolant exits through a rotating joint and is recirculated to the coolant supply. An annular plenum is provided in the rotatable shaft assembly 32. A tube is connected to the plenum which passes down the shaft to connect to the workpiece.

Figure 4:
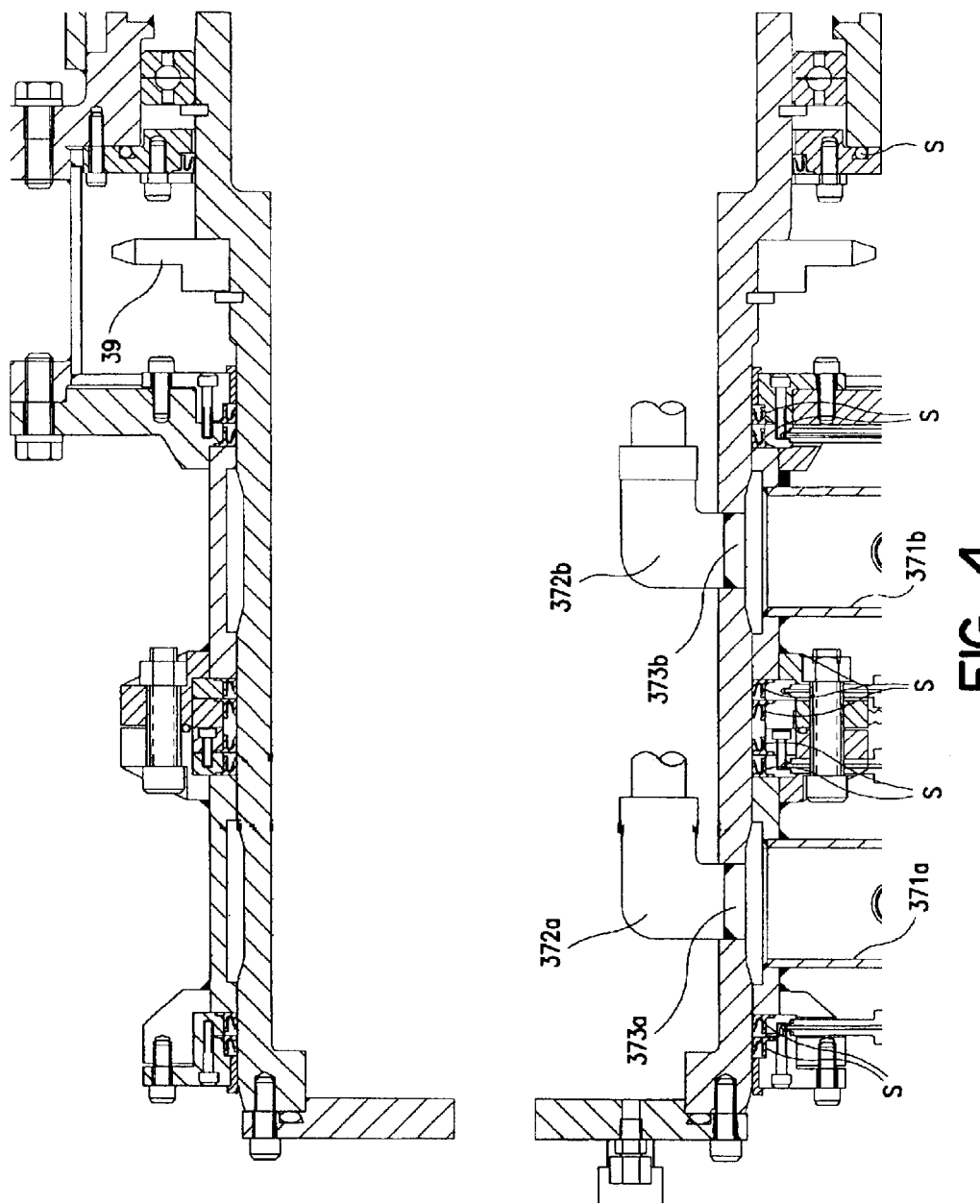
FIG. 4 is a detail view of a section of the rotatable load-carrying mechanism of FIG. 2.

The stationary shaft assembly 31 includes non-rotating shaft that is preferably formed of a carbon steel tube. As shown in FIG. 4, the stationary shaft assembly 31 holds the seals for the rotatable shaft bearings, the workpiece vacuum system connections, and the vacuum/pressure seals "S" for sealing the rotatable shaft to the stationary shaft. The pressure and vacuum seals may be made of various materials known for such purposes, but they are preferably made of polytetrafluoroethylene, commonly known as TEFLON®. An annular cavity 33 is provided between the rotatable shaft and the fixed shaft. This cavity is filled with vacuum pump oil to provide a secondary pressure/vacuum seal. The stationary shaft assembly is jacketed with an outer wall. The jacket includes an integral flange to which the vessel door is bolted. Cooling water is circulated in the cavity between the jacket and stationary shaft to cool the stationary shaft assembly so that it operates at a safe temperature for the operating personnel.

Rotation of the rotatable shaft is accomplished by a chain drive mechanism 37. The rotatable shaft 32 has a sprocket 39 affixed thereto. The sprocket 39 is coupled by a chain (not shown) to a variable speed gear reducer 37' and motor 37" that are operable to rotate the rotatable shaft at a preselected speed.

Thermocouples on the workpiece are connected to the instrumentation and control system by a slip ring assembly 41.

Figure 6:
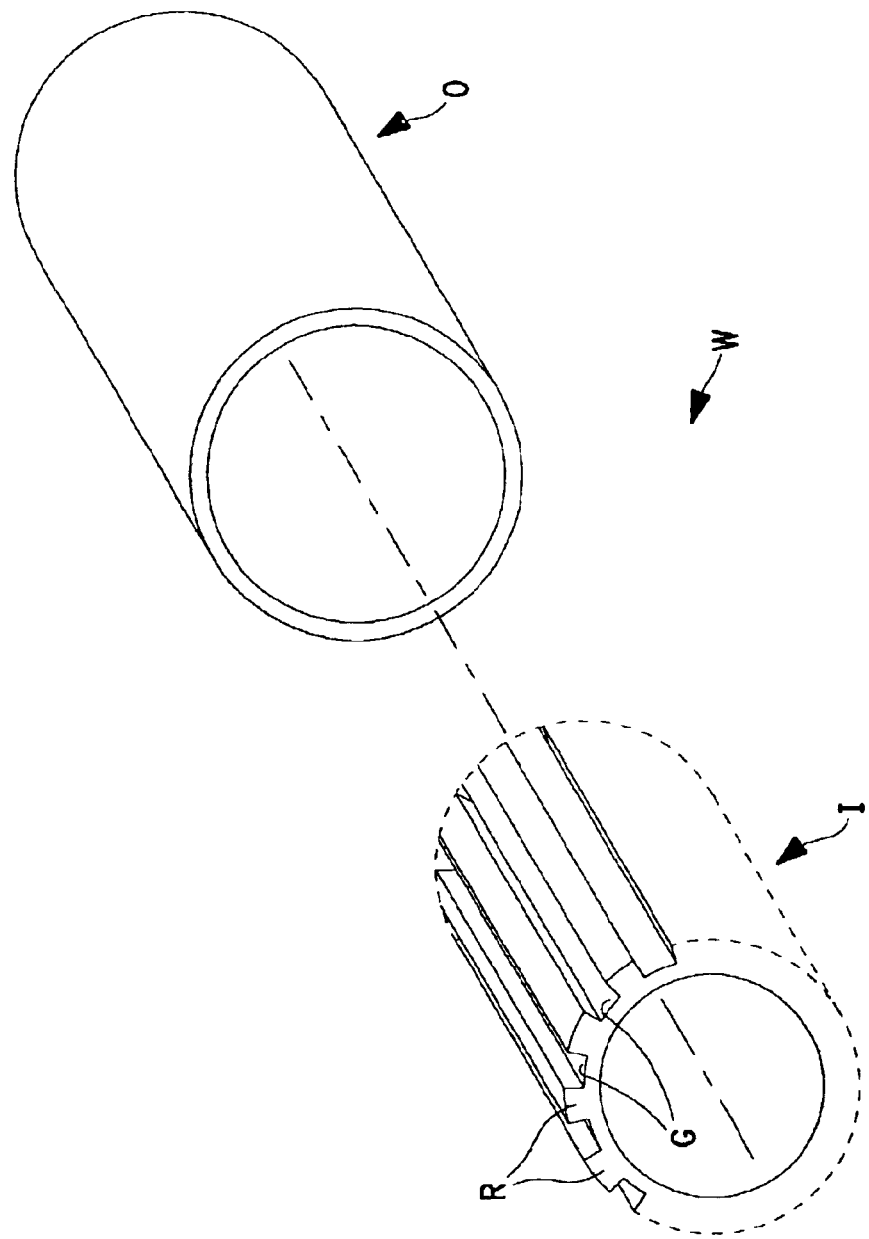
FIG. 6 is an exploded view of a metallic workpiece to be brazed in the vacuum heat treating furnace of FIG. 1.

Referring now to FIG. 6, there is shown an example of a workpiece "W" that can be brazed in the vacuum brazing furnace according to this invention. The workpiece "W" is composed of an inner member "I" and an outer member "O" that are to be brazed together. In the embodiment shown, the inner member "I" has a plurality of raised elements or ribs "R" that are arranged to form a plurality of gaps or recesses "G". When the inner member "I" is assembled to the outer member "O" to form the workpiece "W", the mating of the inner and outer members results in a plurality of cavities that are internal to the workpiece. The second vacuum system 60 is adapted to draw a vacuum in these internal cavities of the workpiece.

Referring back to FIG. 3, the second vacuum system 60 is connected to the workpiece "W" by two vacuum lines that run through the interior of the rotatable shaft assembly 32. The vacuum lines are connected at first ends thereof to the workpiece "W" by either welding the vacuum lines to the workpiece or by suitable vacuum-tight mechanical connections. The vacuum pump and valving for the workpiece evacuation system are external to the furnace chamber and mounted on the transport assembly 23 that supports the rotatable mechanism 30. The workpiece evacuation system preferably includes a mechanical vacuum pump and a blower assembly. A second blower can be utilized upstream of the mechanical vacuum pump. The connection to the vacuum lines in the rotatable shaft is accomplished by lip type seals 36. The workpiece vacuum system allows multiple pump down/purge cycles for the internal cavity of the workpiece.

Rotatable mechanism 30 also includes stationary nozzles 371a, 371b and rotatable nozzles 372a, 372b that are in fluid communication with the stationary nozzles through annular channels 373a, 373b that are formed between the stationary shaft assembly 31 and the rotatable shaft assembly 32. The vacuum lines from the workpiece are connected at their second ends to the rotatable nozzles 372a, 372b with suitable vacuum-tight connectors.

The rotatable mechanism 30 is physically attached to the transport mechanism 23 through the door 21. The transport mechanism 23 has a platform 24, as shown in FIG. 2, on which the vacuum pumps for the workpiece (second) vacuum system are mounted. Power connections to the vacuum pump, gas connections to the rotatable shaft gas cooling system, water connections to the fixed shaft water cooling system, and electrical connections to the workpiece thermocouples are attached to the appropriate power/control cabinet and are carried by a cable track 25.

The transport mechanism 23 is driven by an electric motor 27' which is coupled through a gearbox 27" to a drive chain 27''' and sprocket gear 27''''. The sprocket gear 27'''' is affixed to a drive wheel 28. Limit switches are provided to control the maximum travel distance in each direction. Preferably, the transport mechanism 23 travels on rails 29. Positive mechanical stops are provided at the ends of the rails so that neither the workpiece nor the workpiece handling system 30 are damaged if the electrical control system fails to operate properly.

The forced gas cooling system 50 is designed to cool the workpiece after brazing so that distortion of the workpiece is minimized. The forced gas cooling system also helps to optimize the total process cycle time by reducing the overall cooling time. Cooling of the brazed part may be accomplished by the quiescent process gas and/or by forced convective cooling gas. The primary cooling step is to cool the workpiece with quiescent gas until the braze material has solidified. After braze solidification, the forced convective cooling increases the cooling-rate to thereby shorten the overall process cycle time.

The quiescent cooling is accomplished by shutting off power to the heating elements and allowing the system to cool by radiation of heat to the pressure vessel wall. The inert process gas is cooled by heat exchange with the water-cooled pressure vessel wall, creating a heat convection between the interior of the hot zone and the exterior of the plenum, thereby increasing the overall cooling rate.

The forced gas cooling system is designed to cool the work load by forced convection using gas pressures ranging from about 6 bar (about 90 psig) to about 5 to 7 inches of mercury vacuum (−5 in. to −7 in. Hg). Cooling pressure and timing is selected and included in the process cycle program. The cooling pressures are maintained throughout the cooling process by adding gas as required to maintain the cooling pressure as the gas temperature decreases.

The forced gas cooling system 50 is preferably a recirculating gas system that includes a turbine-type blower 53 that is driven by an electric motor. The cooling gas is forced through a water-cooled, fin and tube heat exchanger 54, preferably with a capacity of removing approximately 3,000,000 BTU/hr. The blower and the heat exchanger are external to the vacuum chamber. The blower and heat exchanger are isolated from the chamber by water cooled valves during heating cycles. Alternatively, the blower and heat exchanger can be located inside the furnace vessel. An example of such an internal blower/heat exchanger arrangement is shown and described in U.S. Pat. No. 4,906,182, the entire content of which is incorporated herein by reference.

A plenum surrounds the hot zone 14 as shown in FIG. 5. The plenum has a front section 15a and a back section 15b. The plenum has a plurality of bungs 16, 17 in the end walls of the hot zone 14. The bungs 16, 17 are operable to permit the cooling gas to flow into and out of the hot zone in the direction of the arrows "L", thereby causing the cooling gas to flow across and remove heat from the workpiece "W". The forced gas cooling system includes an inlet 51 through which the cooling gas enters the front plenum 15a. An outlet 52 is also provided through which the cooling gas exits the rear plenum section 15b once it has traveled through the hot zone 14. Inlet bungs 16 are mounted at the front end of the hot zone 14 and are operable to move in the direction of the arrows "A" during the forced cooling cycle to provide an opening from the plenum into the hot zone. Similarly, outlet bungs 17 are mounted at the back end of hot zone 14 and are operable to move in the direction of arrows "B" during the forced cooling cycle to provide an opening from the hot zone into the plenum. The front and back plenum sections 15a, 15b are separated by a circumferential wall or bulkhead 18 for preventing the heated exiting gas from mixing with the incoming cooled gas.

Alternatively, a plurality of gas injection nozzles can be arranged about the circumference of the hot zone to permit injection of the cooling gas from the plenum to the hot zone interior. It is also contemplated that such nozzles can be included in one of the end walls of the hot zone to permit a larger volume of the cooling gas to enter or exit the hot zone. In such an arrangement, the plenum would be constructed to prevent mixing of the cool incoming gas with the hot exiting gas.

A typical sequence for operating the vacuum brazing furnace of this invention will now be described. With the workpiece handling assembly in position "A", the workpiece "W" is mounted onto rotatable shaft assembly 32 and affixed to the flange 34. The transport mechanism 23 is then operated to move the rotatable mechanism 30 and door 21 to position "B" in which the workpiece is inside the vessel chamber and the door flange mates with the vessel flange. The door 21 is then locked in placed and sealed. The sealed pressure vessel 12 is then evacuated by the first vacuum pumping system 40. When the desired vacuum is reached, the pressure vessel 12 is backfilled with argon gas. The pressure vessel 12 is then evacuated again.

A vacuum is then drawn on the interior of the workpiece using the second vacuum pumping system 60. This vacuum forces outer member "O" to be pulled tighter against the inner member "I" for a stronger braze. Argon gas is backfilled into the interior cavities of the workpiece, and then a second vacuum is drawn in the workpiece interior. The sequence of evacuation and backfilling of the workpiece interior cavities may be performed several times as required. The heating elements in hot zone 14 are energized and the temperature is ramped up in accordance with the process program. Simultaneously, the vessel chamber is pressurized by the heating of the inert gas with occasional injection of additional argon gas as necessary. The temperature and pressure are continuously increased until the desired temperature and pressure conditions for brazing the workpiece W are reached. The preferred temperature and pressure will depend on the size of the workpiece and the type of material or materials that are being brazed. The workpiece is maintained at the brazing temperature and pressure for a time sufficient to ensure thorough heating of the workpiece.

Post process cooling is accomplished by the forced gas cooling system. At the end of the heating portion of the brazing cycle, the furnace chamber is vented to reduce the chamber pressure to approximately 14 psi. The valves that isolate the cooling gas heat exchanger and blower during the heating cycle are opened and any residual gas in the chamber is forced over the workpiece from a plenum in the door of the vacuum chamber to a plenum at the rear of the chamber. The gas is then forced by the blower through a water cooled heat exchanger and back to the supply plenum in the vacuum chamber door. The pressure vessel is then pressurized to atmospheric pressure so that it can be opened for removal of the workpiece.

Referring now to FIGS. 7–11 there is shown a second embodiment of a vacuum heat treating furnace 110 in accordance with the present invention. The vacuum heat treating furnace 110 is similar in construction to that described previously herein. In that regard the vacuum furnace 110 includes a pressure vessel 112 having a hot zone 114 disposed therein. Vacuum furnace 110 also includes a workpiece handling system 120 which is movable relative to the pressure vessel 112 so that the handling system 120 may be moved between a first position and a second position relative to the pressure vessel 112. The workpiece handling system 120 includes a first access door 121 for the pressure vessel 112, a rotatable mechanism 130 for supporting and rotating a workpiece W during a brazing cycle, and a transport mechanism 123 for moving the workpiece handling system 120. A gas injection system is connected to the pressure vessel 112 so that the vessel chamber can be pressurized with an inert gas during a processing cycle.

The vacuum heat treating furnace 110 further includes a first vacuum system 140 that is connected to the pressure vessel 112 for drawing a vacuum therein during a processing cycle. A second vacuum system 160 is provided in the work piece handling system 120 for evacuating an internal cavity of the workpiece during the processing cycle. Additionally, a forced gas cooling system 150 is connected to the vessel chamber to assist with controlled cooling of the workpiece at the end of a processing cycle.

A furnace cooling system 170 is provided to cool the pressure vessel 112 and the vessel ancillary systems and components so that the structural integrity of the vessel is maintained and operating personnel are provided with a safe working environment. The furnace cooling system 170 utilizes a single coolant supply, preferably water, and a drain connection. The furnace cooling system 170 also includes the pressure regulating controls, sub-system controls, shut-off valves, manifolds, and hoses needed to provide the coolant to the pressure vessel 112 and the associated systems.

Figure 7:
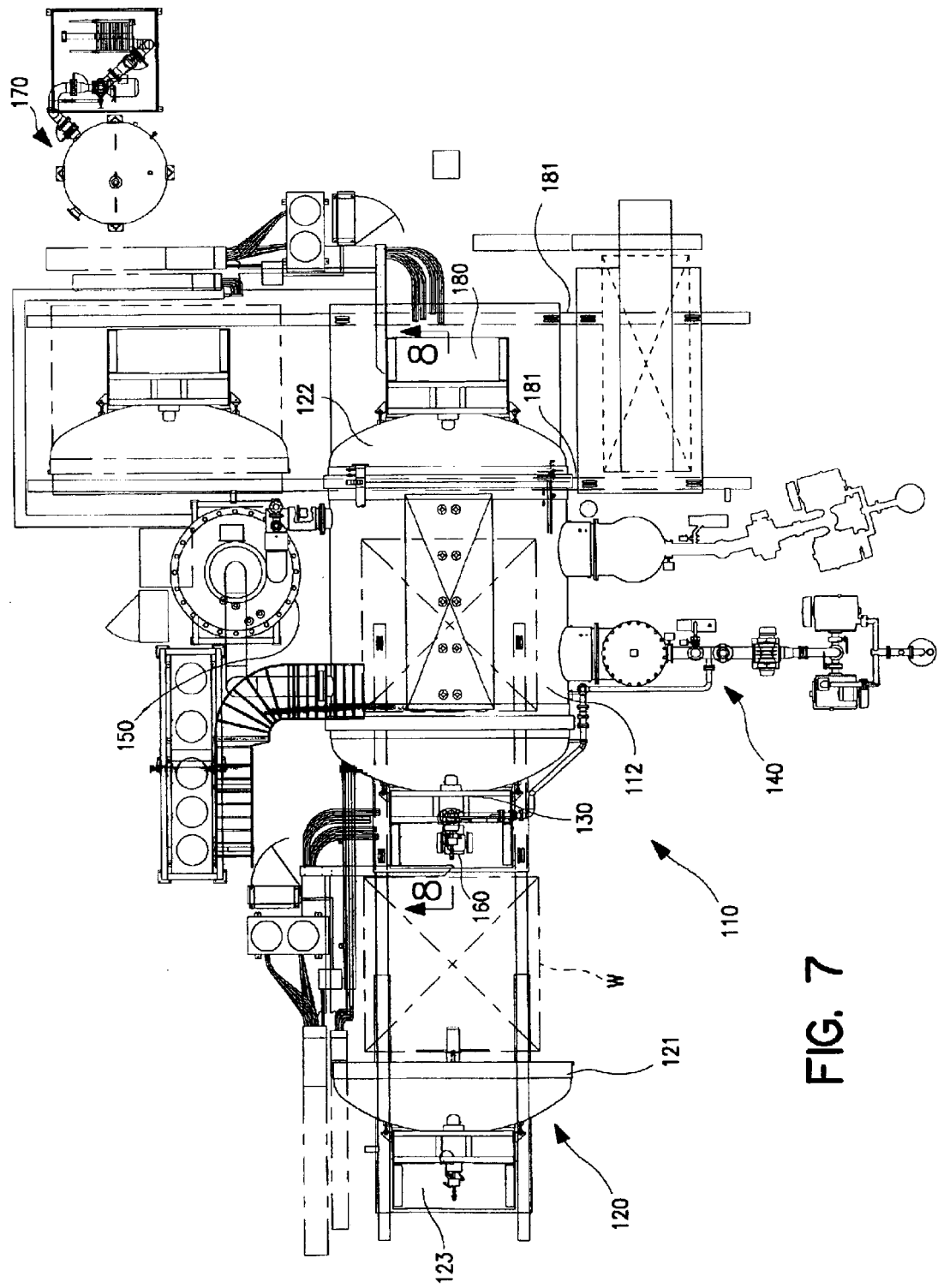
FIG. 7 is a top plan view of an alternative arrangement of a vacuum heat treating furnace in accordance with the present invention.
Figure 11:
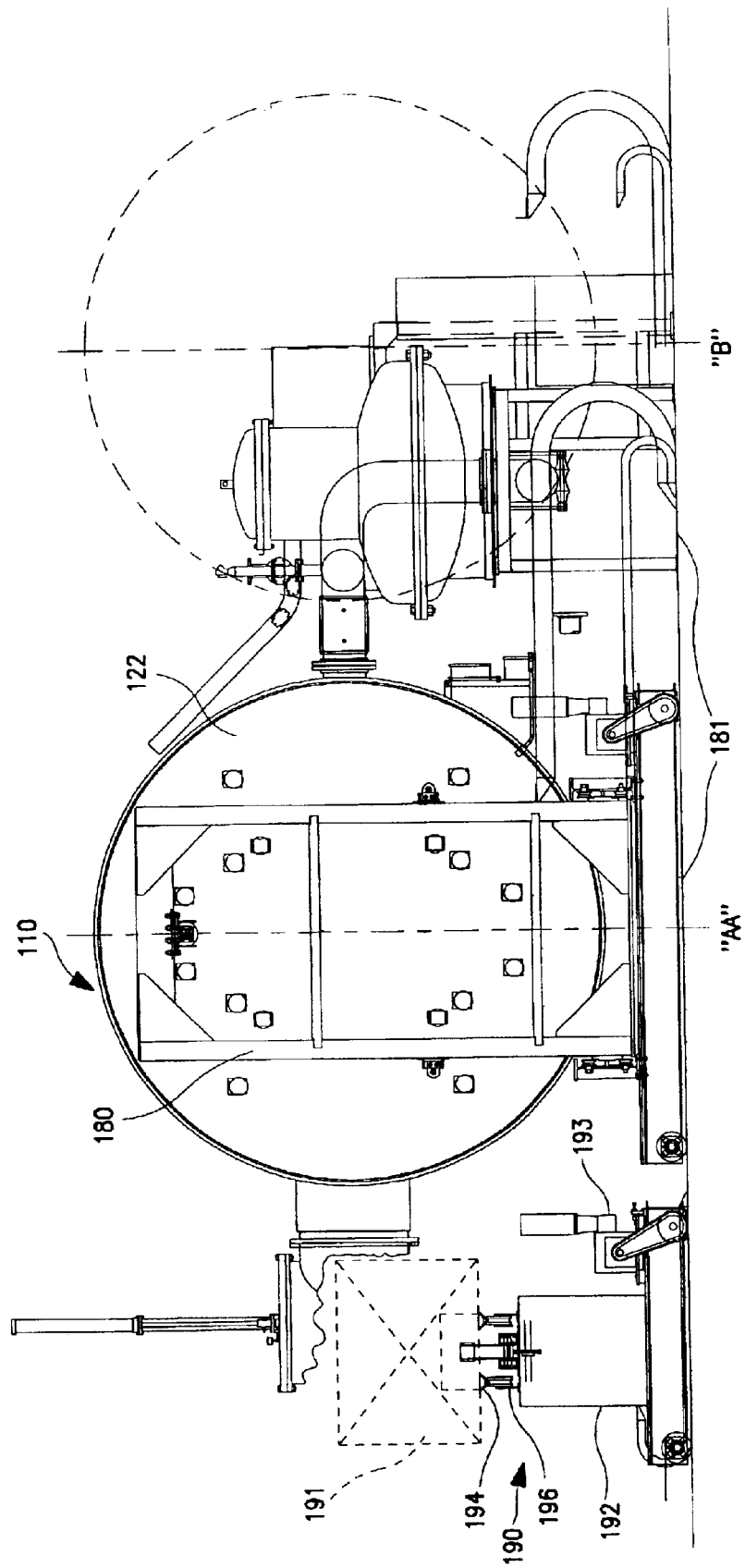
FIG. 11 is an end elevation view of the vacuum heat treating furnace of FIG. 7 showing the second door and load handling car thereof.

In addition to the foregoing features, the vacuum furnace 110 has a second door 122 provided at the end of the pressure vessel opposite the first door 121. The second door is of autoclave design for sealing the pressure vessel when in the closed position. The second door 122 is supported on a second transport mechanism 180 which is similar in construction to the first transport mechanism 123. The second transport mechanism 180 has a motor driven device 182 which cooperates with the wheels of the transport mechanism 180 to move the transport mechanism along rails 181. As shown in FIGS. 7 and 11, the rails 181 are oriented transverse to the longitudinal axis of the pressure vessel 112 so that the second door 122 can be moved to the side of the vacuum furnace 110, thereby providing unobstructed access to the interior of the pressure vessel 112. This arrangement permits easy loading and unloading of a workpiece or batch of workpieces. The workpiece can be loaded or unloaded by a mobile device such as a fork lift truck. However, a load cart 190 is also provided for loading and unloading a workpiece 191 into/from the vacuum furnace 110.

Figure 8:
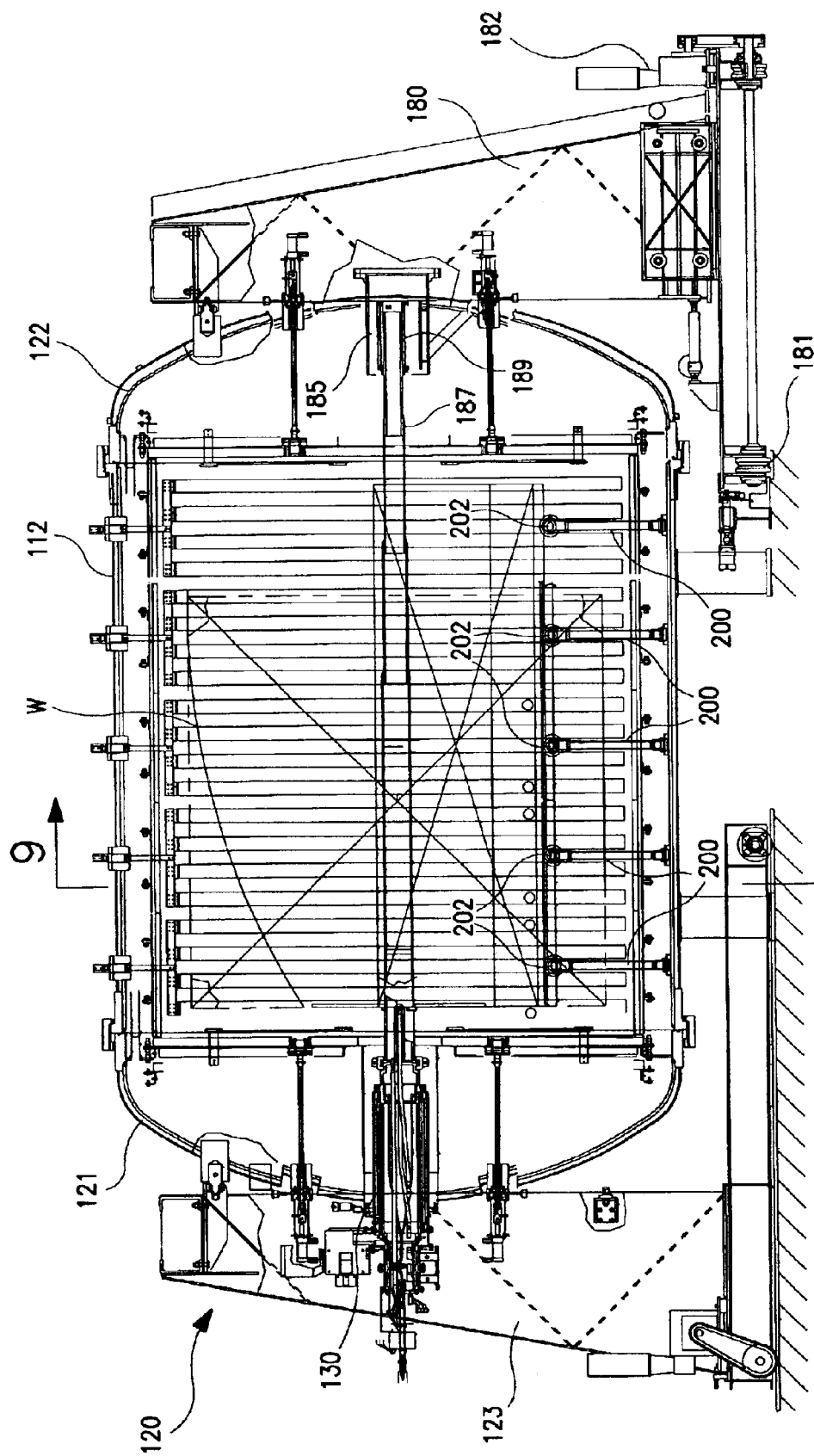
FIG. 8 is a side elevation view in partial cross section of the vacuum heat treating furnace of FIG. 7, as viewed along line 8—8 therein.
Figure 9:
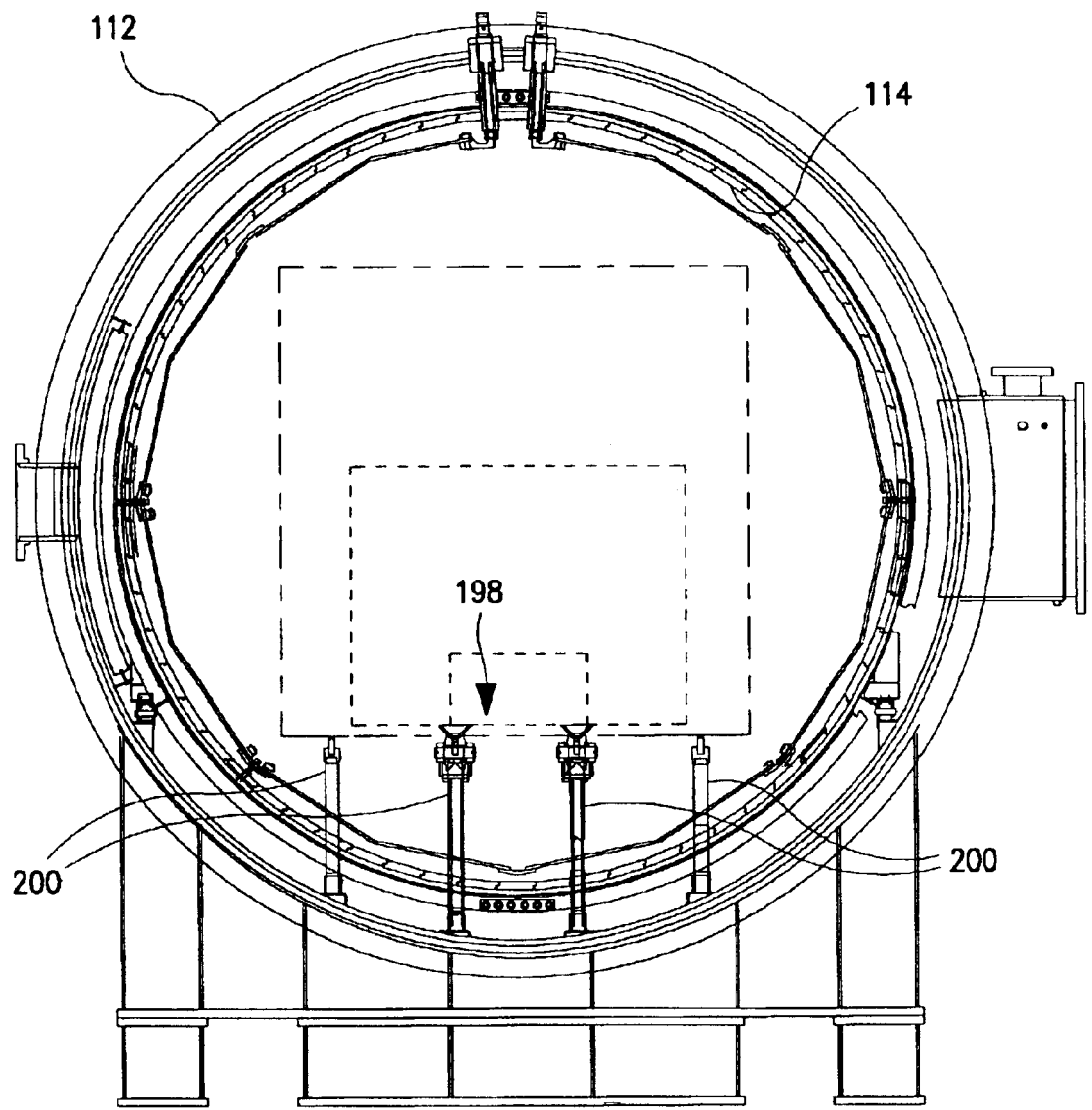
FIG. 9 is an end elevation view in partial cross section of the vacuum heat treating furnace of FIG. 8, as along line 9—9 therein.
Figure 10:
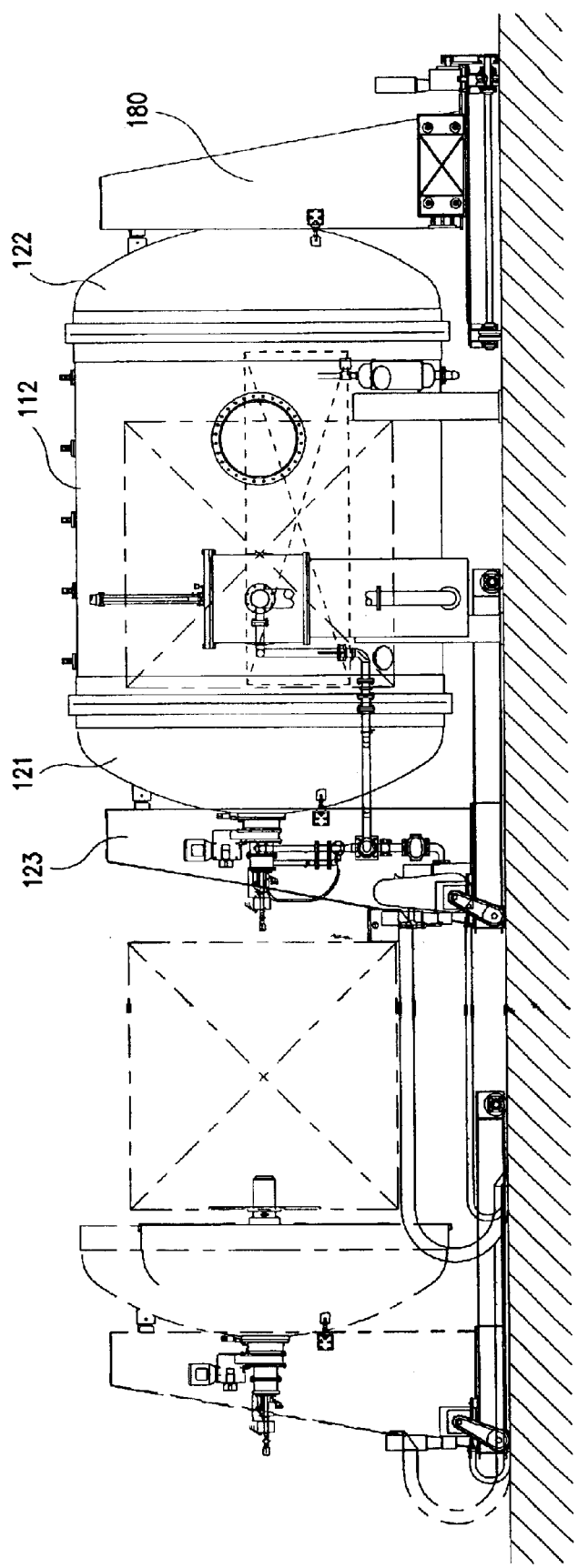
FIG. 10 is a partial side elevation view of the vacuum heat treating furnace of FIG. 7.

The load cart 190 includes a pedestal 192 and a drive mechanism 193. The drive mechanism 193 cooperates with the wheels on the bottom of the load cart 190 to move the load cart 190 along the rails 181. The load cart 190 includes support rails 194 for supporting the workpiece load 191 on wheels 196 affixed to the top of the pedestal 192. Referring now to FIGS. 8 and 9, a stationary hearth 198 is provided inside the furnace hot zone 114. The stationary hearth 198 includes a plurality of load supports 200 having wheels 202 affixed to the tops thereof.

In operation, the load cart 190 with a workpiece load 191 is moved along the rails 181 until the support rails 194 are aligned with the wheels 202 on the stationary hearth 198. The workpiece load 191 can then be rolled into the hot zone 114 on the support rails 194 which engage with the wheels 202. Removal of the workpiece load 191 is accomplished by reversing the loading process.

When the vacuum furnace 110 is used in the rotary mode, as shown in FIG. 8, it sometimes occurs that the workpiece W is too heavy to be supported at just one end. Accordingly, additional support is needed to prevent sagging of the workpiece W and the rotatable shaft which supports it. To that end, the second door 122 has a support bearing 185 formed or mounted on the interior side thereof. The support bearing is positioned substantially centrally on the second door 122 and is formed to receive one end of a support shaft 187. The other end of support shaft 187 is connected to the rotatable mechanism 130 so that it rotates therewith during a processing cycle. The support bearing 185 preferably includes a support bushing therein which contacts the support shaft 187.

It will be recognized by those skilled in the art that changes or modifications may be made to the above-described invention without departing from the broad inventive concepts of this invention. It is understood, therefore, that the invention is not limited to the particular embodiments disclosed herein, but is intended to cover all modifications and changes which are within the scope of the invention as described. For example, although the embodiment of the vacuum brazing furnace according to this invention has been shown and described with a horizontal pressure vessel and workpiece handling system, in another embodiment, the pressure vessel can be built with a vertical orientation. In such an arrangement, a single door is utilized for accessing the interior of the pressure vessel.

In view of the foregoing disclosure, some of the advantages of the vacuum brazing furnace of this invention should now be apparent. For example, a vacuum brazing furnace has been described in which the workpiece can be supported in a stationary manner or can be rotated during a brazing cycle. The ability to rotate the workpiece prevents deformation of the workpiece by sagging when it is at the elevated brazing temperature. The ability to rotate the workpiece also permits uniform heating of the workpiece and uniform application of the brazing material which result in stronger brazed joints.

Additionally, a vacuum brazing furnace has been described in which a vacuum can be applied to the interior of the workpiece while pressure is applied to the exterior of the workpiece. This feature also improves the uniformity and strength of the brazed joints. Further, a workpiece handling system is provided that facilitates opening and closing of the furnace vessel and loading and unloading of a workpiece.

What is claimed is:

1. A vacuum heat treating furnace for brazing a large metallic part, comprising:
   a pressure vessel having a cylindrical wall and a door dimensioned and positioned for closing an end of said cylindrical wall;
   a thermally insulated enclosure disposed in said pressure vessel, said enclosure defining a hot zone therein;
   a plurality of electric heating elements mounted to said thermally insulated enclosure in the hot zone;
   a workpiece handling system mounted on the pressure vessel door for supporting a metallic workpiece, said workpiece having a first part and a second part, which when assembled together have a spaced region therebetween; and
   a first vacuum system connected to said pressure vessel for drawing a vacuum in the interior of said pressure vessel, including said hot zone.

2. A vacuum heat treating furnace as set forth in claim 1 wherein the workpiece handling system comprises transport means for moving the door relative to said pressure vessel, whereby the pressure vessel can be opened and closed.

3. A vacuum heat treating furnace as set forth in claim 1 wherein the workpiece handling system comprises means for rotating the workpiece inside the vacuum heat treating furnace.

4. A vacuum heat treating furnace as set forth in claim 3 wherein the workpiece rotating means comprises:
   a rotatable shaft assembly;
   a flange mounted on a first end of the rotatable shaft assembly for attaching the workpiece thereto;
   a stationary shaft assembly affixed to the pressure vessel door for supporting said rotatable shaft assembly; and
   bearing means disposed between said rotatable shaft assembly and said stationary shaft assembly for facilitating rotation of said rotatable shaft assembly relative to said stationary shaft assembly.

5. A vacuum heat treating furnace as set forth in claim 4 wherein said rotatable shaft assembly comprises means for cooling the rotatable shaft assembly during a heating cycle of the vacuum heat treating furnace.

6. A vacuum heat treating furnace as set forth in claim 1 wherein the workpiece handling system comprises a second vacuum system that is connectable to the workpiece such that a subatmospheric pressure can be applied to the spaced region in the workpiece.

7. A vacuum heat treating furnace as set forth in claim 1 further comprising means for circulating a cooling gas through the hot zone.

8. A vacuum heat treating furnace as set forth in claim 7 wherein the cooling gas circulating means comprises:

inlet ports formed in the thermally insulated enclosure;

outlet ports formed in the thermally insulated enclosure;

a plenum surrounding the thermally insulated enclosure, said plenum having an inlet plenum section and an outlet plenum section, said inlet plenum section being in fluid communication with said inlet ports and said outlet plenum section being in fluid communication with said outlet ports;

means for forcing the cooling gas into the inlet plenum section and for drawing the cooling gas out of the outlet plenum section; and means for removing heat from the cooling gas.

9. A vacuum heat treating furnace as set forth in claim 1 comprising means for removing heat from the cylindrical wall of said pressure vessel.

10. A vacuum heat treating furnace as set forth in claim 1 further comprising a second door disposed at a second end of the cylindrical wall of said pressure vessel.

11. A vacuum heat treating furnace as set forth in claim 10 wherein said workpiece handling means comprises an elongated shaft for supporting the workpiece; and wherein the second door comprises bearing means for receiving an end of said elongated shaft, whereby additional support is provided for the workpiece.

12. A vacuum heat treating furnace as set forth in claim 10 further comprising transport means for moving said second door relative to said pressure vessel, whereby the pressure vessel can be opened and closed at the second end thereof.

13. A vacuum heat treating furnace as set forth in claim 10 further comprising a load car adapted to support a workpiece load and means for moving said load car with the workpiece load into and out of the furnace hot zone through the second end of the cylindrical wall of said pressure vessel.

* * * * *